United States Patent
Matsui

(10) Patent No.: US 11,054,028 B2
(45) Date of Patent: Jul. 6, 2021

(54) CONTINUOUSLY VARIABLE TRANSMISSION CONTROL DEVICE AND CONTROL METHOD

(71) Applicants: JATCO Ltd, Fuji (JP); NISSAN MOTOR CO., LTD., Yokohama (JP)

(72) Inventor: Junki Matsui, Odawara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/643,650

(22) PCT Filed: Nov. 13, 2018

(86) PCT No.: PCT/JP2018/041890
§ 371 (c)(1),
(2) Date: Mar. 2, 2020

(87) PCT Pub. No.: WO2019/098162
PCT Pub. Date: May 23, 2019

(65) Prior Publication Data
US 2020/0240516 A1    Jul. 30, 2020

(30) Foreign Application Priority Data
Nov. 14, 2017 (JP) .............................. JP2017-218777

(51) Int. Cl.
*F16H 61/662*    (2006.01)
*F16H 61/00*    (2006.01)
(Continued)

(52) U.S. Cl.
CPC .  *F16H 61/66272* (2013.01); *F16H 61/66259* (2013.01); *F16H 61/0021* (2013.01);
(Continued)

(58) Field of Classification Search
CPC ......... F16H 2059/465; F16H 2059/683; F16H 61/0021; F16H 61/02; F16H 61/12;
(Continued)

(56) References Cited

U.S. PATENT DOCUMENTS 5,222,417 A *  6/1993  Sato .................... F16H 61/0021
                                                474/28
5,673,166 A *  9/1997  Hoffman .............. H01H 47/325
                                                361/160

(Continued)

FOREIGN PATENT DOCUMENTS

JP    H11-82724 A    3/1999

*Primary Examiner* — Edwin A Young
(74) *Attorney, Agent, or Firm* — Foley & Lardner LLP

(57) ABSTRACT

A CVT is provided with a primary pulley (1) and a secondary pulley (2) between which a belt (3) is wound, and hydraulic pressure control valves (5, 6, 7) which control pulley hydraulic pressures. A CVT controller (8) sets a base current indicated value to be output to solenoids (5a, 6a, 7a) of the hydraulic pressure control valves (5, 6, 7), on the basis of a pulley hydraulic pressure indicated value. A dither control unit (58) of the CVT controller (8) superimposes a dither current onto the base current indicated value to be output to the solenoids (5a, 6a, 7a) if, during pulley hydraulic pressure control, the situation is determined, on the basis of belt slip determination information, to be such that belt slipping is highly likely to occur.

9 Claims, 8 Drawing Sheets

(51) Int. Cl.
  *F16H 61/02* (2006.01)
  *F16H 61/12* (2010.01)
  *F16H 59/46* (2006.01)
  *F16H 59/68* (2006.01)

(52) U.S. Cl.
  CPC .............. *F16H 61/02* (2013.01); *F16H 61/12* (2013.01); *F16H 2059/465* (2013.01); *F16H 2059/683* (2013.01); *F16H 2061/66277* (2013.01)

(58) Field of Classification Search
  CPC ......... F16H 61/66259; F16H 61/66272; F16H 2061/66277; F16H 2061/6629
  See application file for complete search history.

(56) References Cited

U.S. PATENT DOCUMENTS

| | | | |
|---|---|---|---|
| 5,720,691 A * | 2/1998 | Ogawa | F16H 61/66259 474/28 |
| 5,971,889 A | 10/1999 | Ohashi | |
| 2010/0101653 A1 * | 4/2010 | Ogata | F16H 61/66259 137/2 |

* cited by examiner

FIG.3
(RIPPLE CURRENT WAVEFORM)
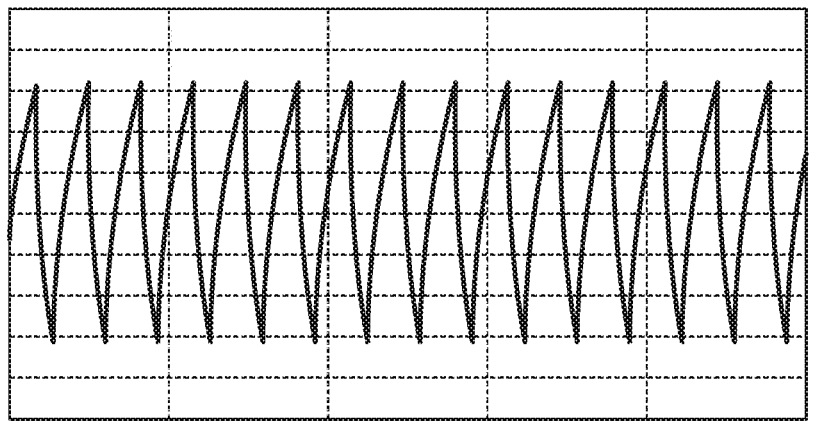
(DITHER CURRENT WAVEFORM)
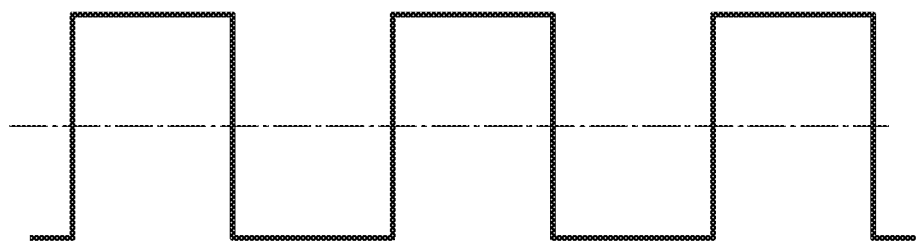
(DITHER-OPERATED WAVEFORM)
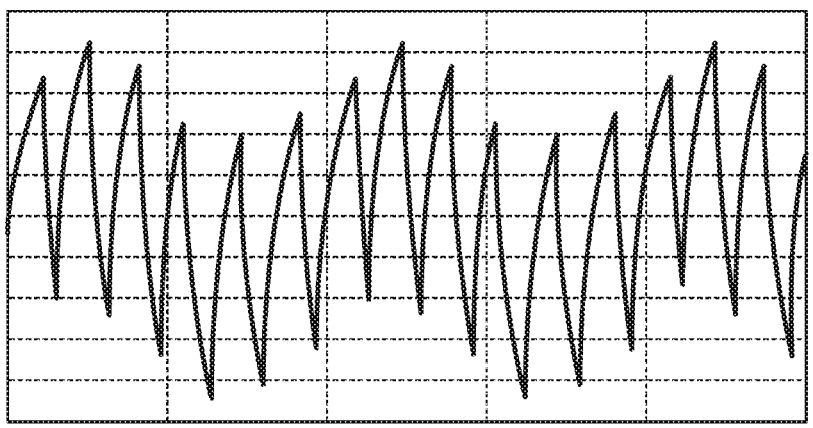

CONTINUOUSLY VARIABLE TRANSMISSION CONTROL DEVICE AND CONTROL METHOD

TECHNICAL FIELD

The present invention relates to a control device and a control method for a continuously variable transmission including a hydraulic pressure control valve structured to control a pulley hydraulic pressure supplied to primary and secondary pulleys, wherein a belt is wound around the primary and secondary pulleys.

BACKGROUND ART

Conventionally, a control device for a vehicular automatic transmission is disclosed, wherein when the vehicular automatic transmission is not being shifted with a linear solenoid (hydraulic pressure control valve), the control device supplies a dither current to the linear solenoid, and thereby causes a piston movement in the hydraulic pressure control valve or the like, and removes foreign matter such as sand particles (see patent document 1, for example).

However, in case that the conventional device is applied to a belt-type continuously variable transmission, when foreign matter enters the linear solenoid or the hydraulic pressure control valve connected to the linear solenoid during pulley hydraulic pressure control, the linear solenoid and hydraulic pressure control valve may be locked or so. This may cause a decrease in secondary hydraulic pressure, and thereby cause belt slipping. This dither operation is effective for removal of foreign matter. However, there has been a problem that if the dither operation is controlled to be performed constantly while no transmission shifting is being performed, the frequency of the dither operation is too high, and a load is unnecessarily applied to the hydraulic pressure control valve, thereby adversely affecting the durability and reliability of the hydraulic pressure control valve.

The present invention has been made in view of the problems described above. It is an object of the present invention to prevent the occurrence of belt slipping during the pulley hydraulic pressure control, without adversely affecting the durability and reliability of the hydraulic pressure control valve.

PRIOR ART DOCUMENT(S)

Patent Document(s)

Patent Document 1: JP H11-82724 A

SUMMARY OF INVENTION

According to the present invention, a continuously variable transmission control device includes: a hydraulic pressure control valve structured to control a pulley hydraulic pressure supplied to primary and secondary pulleys, wherein a belt is wound around the primary and secondary pulleys; and a controller configured to set a command base current outputted to a solenoid of the hydraulic pressure control valve, based on a command value of the pulley hydraulic pressure; wherein the controller includes a dither control section configured to: acquire belt-slip-determining information for determining a possibility of occurrence of slip of the belt during control of the pulley hydraulic pressure; and perform a dither operation in response to a determination based on the belt-slip-determining information that the possibility of occurrence of slip of the belt is high, wherein the dither operation is to superimpose a dither current on the command base current.

By thus limiting the dither operation to situations that the possibility of occurrence of slip of the belt is high, it is possible to prevent the occurrence of slip of the belt during pulley hydraulic pressure control, without adversely affecting the durability and reliability of the hydraulic pressure control valve.

BRIEF DESCRIPTION OF DRAWINGS

FIG. 3 is a current waveform diagram showing an example of current waveform applied to a solenoid during dither-on operation based on dither operation determination by a dither control section.

MODE(S) FOR CARRYING OUT INVENTION

Figure 1:
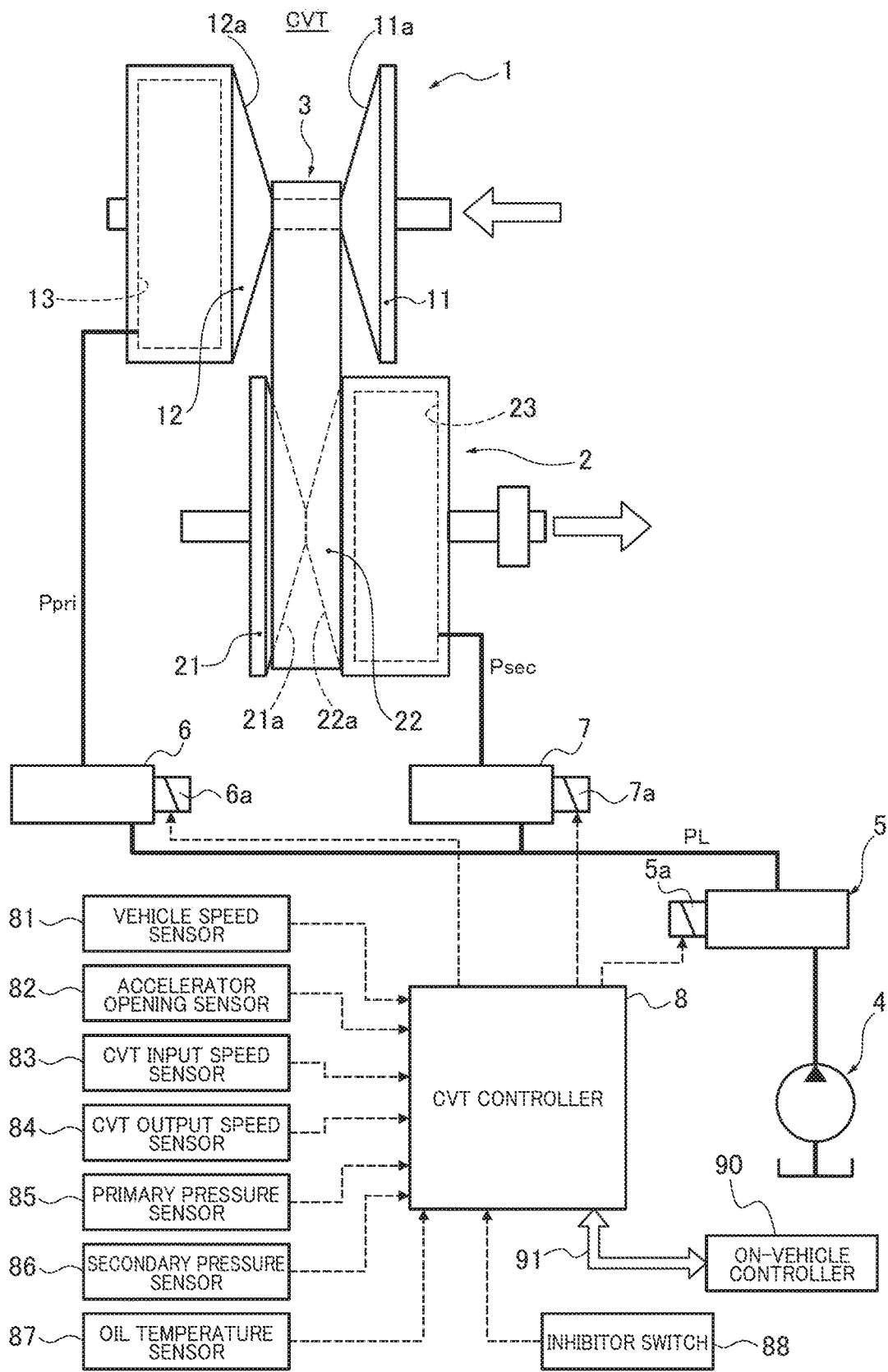
FIG. 1 is an overall system diagram showing a belt-type continuously variable transmission to which a control device according to an embodiment is applied.

The following describes the best mode for carrying out a continuously variable transmission control device according to the present invention, with reference to an embodiment shown in the drawings.

First, the following describes configuration of a continuously variable transmission control device of an enginemounted vehicle such as an engine vehicle or hybrid vehicle in which a transmission is a belt-type continuously variable transmission and a driving source is an engine, according to the embodiment, separately in sections "Overall System Configuration", "Detailed Configuration of Dither Control System", and "Configuration of Dither Operation Determination Control Process Against Belt Slipping".

[Overall System Configuration] FIG. 1 shows the belt-type continuously variable transmission to which the control device according to the embodiment is applied. The following describes overall system configuration of belt-type continuously variable transmission CVT with reference to FIG. 1.

As shown in FIG. 1, belt-type continuously variable transmission CVT includes a primary pulley 1, a secondary pulley 2, and a belt 3.

Primary pulley 1 is composed of a fixed pulley 11 having a sheave face 11a and a driven pulley 12 having a sheave face 12a, and is structured to receive input of a driving torque from the driving source not shown (engine, motor, etc.). Driven pulley 12 is formed with a primary pressure chamber 13 for hydraulically driving the driven pulley 12 in an axial direction with respect to fixed pulley 11.

Secondary pulley 2 is composed of a fixed pulley 21 having a sheave face 21a and a driven pulley 22 having a sheave face 22a, and is structured to output a driving torque to driving wheels via a final reduction gear and others. Driven pulley 22 is formed with a secondary pressure chamber 23 for hydraulically driving the driven pulley 22 in an axial direction with respect to fixed pulley 21.

Belt 3 is wound over the sheave faces 11a, 12a of primary pulley 1 and the sheave faces 21a, 22a of secondary pulley 2. Continuous shifting of a transmission ratio is implemented by varying the distance between the sheave faces 11a, 12a and the distance between the sheave faces 21a, 22a. Belt 3 is implemented by a chain belt or the like for transmitting a torque by tension, wherein the chain belt is composed by: placing two pins back to back, wherein each pin has an arcuate surface; and connecting one pair to another pair by many links. At a highest speed transmission ratio, a contact portion of belt 3 in contact with primary pulley 1 has a maximized radius, and a contact portion of belt 3 in contact with secondary pulley 2 has a minimized radius. At a lowest speed transmission ratio, a contact portion of belt 3 in contact with primary pulley 1 has a minimized radius, and a contact portion of belt 3 in contact with secondary pulley 2 has a maximized radius.

As shown in FIG. 1, belt-type continuously variable transmission CVT includes a hydraulic pressure control system that includes an oil pump 4, a line pressure solenoid valve 5 (hydraulic pressure control valve), a primary pressure solenoid valve 6 (hydraulic pressure control valve), and a secondary pressure solenoid valve 7 (hydraulic pressure control valve). Each of these valves (henceforth referred to as hydraulic pressure control valves 5, 6, 7) includes a solenoid-movable portion such as a spool that is structured to be moved by a solenoid current applied to a solenoid 5a, 6a, 7a. Hydraulic pressure control valve 5, 6, 7 is structured such that a controlled pressure to be outputted is maximized when a command current is minimized, and the controlled pressure is minimized when the command current is maximized.

Line pressure solenoid valve 5 is structured to regulate a line pressure PL, based on a pump discharge pressure from oil pump 4, wherein line pressure PL serves as the highest one of transmission shifting pressures.

Primary pressure solenoid valve 6 is structured to regulate a primary pressure Ppri from line pressure PL as a source pressure, wherein primary pressure Ppri is supplied to primary pressure chamber 13. For example, primary pressure Ppri is set equal to line pressure PL at the highest speed transmission ratio, and set to decrease toward the lowest speed transmission ratio.

Secondary pressure solenoid valve 7 is structured to regulate a secondary pressure Psec from line pressure PL as a source pressure, wherein secondary pressure Psec is supplied to secondary pressure chamber 23. For example, secondary pressure Psec is set equal to line pressure PL at the lowest speed transmission ratio, and set to decrease toward the highest transmission ratio.

As shown in FIG. 1, belt-type continuously variable transmission CVT includes an electronic control system that includes a CVT controller 8 (controller) configured to control the transmission ratio of belt-type continuously variable transmission CVT. CVT controller 8 receives input from sensors that include a vehicle speed sensor 81, an accelerator opening sensor 82, a CVT input rotation speed sensor 83, a CVT output rotation speed sensor 84, a primary pressure sensor 85, a secondary pressure sensor 86, an oil temperature sensor 87, an inhibitor switch 88, etc. CVT controller 8 further receives information required for controls, such as engine torque information, engine speed information, battery power supply voltage information, etc., from a different on-vehicle controller 90 via a CAN communication line 91.

CVT controller 8 performs a transmission ratio control by: determining a target primary rotation speed, depending on an operating point on a shift schedule, wherein the operating point is defined by a vehicle speed VSP sensed by vehicle speed sensor 81 and an accelerator opening APO sensed by accelerator opening sensor 82; converting the target primary rotation speed into a hydraulic pressure command value; converting the hydraulic pressure command value into a base current command value of a ripple current by PWM control; and controlling the primary pressure Ppri and secondary pressure Psec by a two-degree-of-freedom control (FF+PID) of a PWM frequency synchronization type. The PWM control is a pulse width modulation control at a predetermined frequency, wherein "PWM" is an abbreviation of "Pulse Width Modulation". "FF" refers to feedforward control, and "PID" refers to feedback control (FB control) based on proportional (P), integral (I), and differential (D) components.

Figure 2:
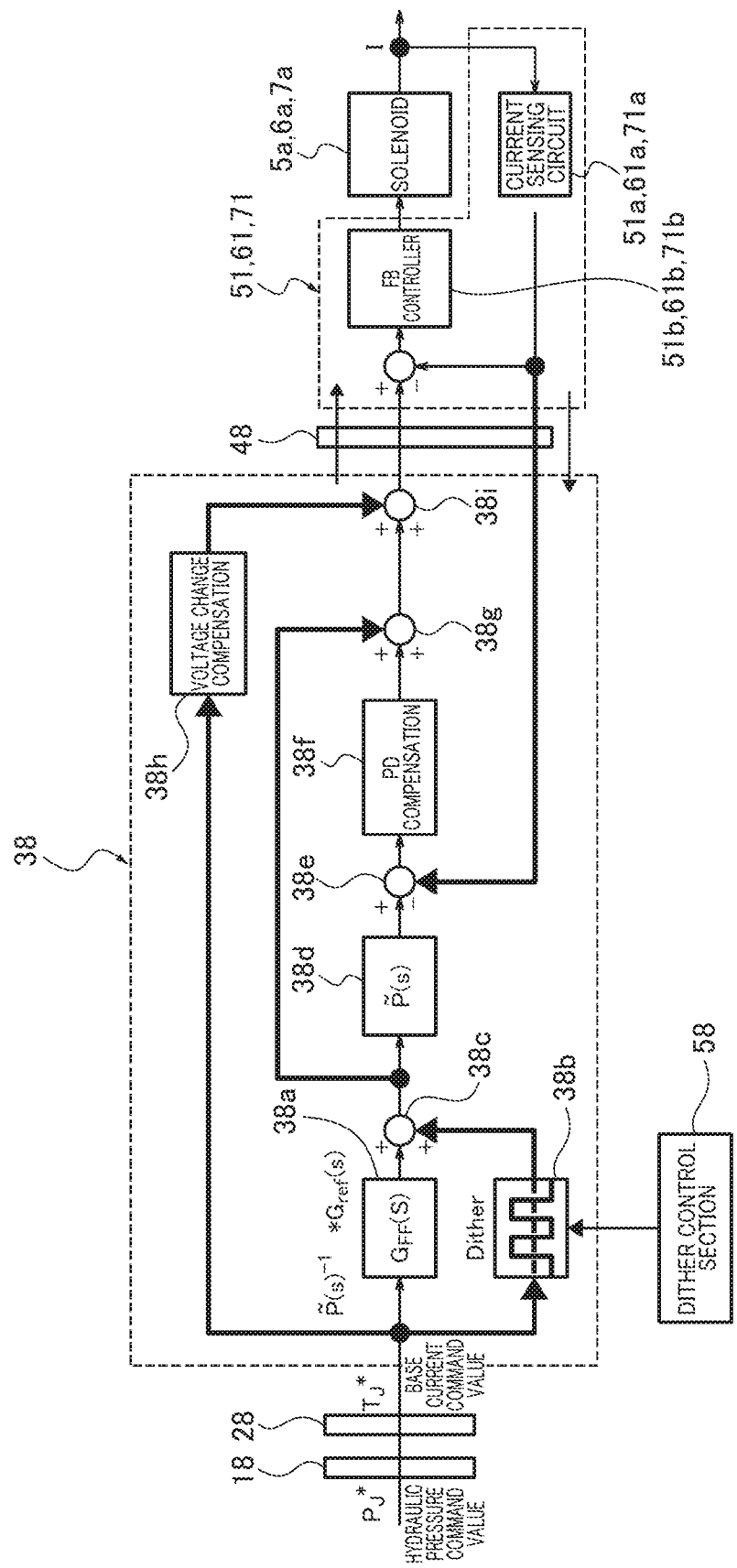
FIG. 2 is a block diagram showing configuration of a dither control system of a CVT controller and hydraulic pressure control valves according to the embodiment.

[Detailed Configuration of Dither Control System] FIG. 2 shows configuration of a dither control system of CVT controller 8 and hydraulic pressure control valves 5, 6, and 7 according to the embodiment. FIG. 3 shows an example of current waveform applied to a solenoid during dither-on operation based on dither operation determination by a dither control section 58. The following describes a detailed configuration of the dither control system for superimposing a dither on a ripple current waveform based on a two-degree-of-freedom control (FF+PID) of a PWM frequency synchronization type, with reference to FIGS. 2 and 3.

As shown in FIG. 2, CVT controller 8 includes a hydraulic-pressure-to-electric-current conversion section 18, an electronic calibration section 28, a solenoid current control section 38, SOL drive ICs 51, 61, 71, an IF control switch section 48, and a dither control section 58. A control cycle is set as a function synchronized with the PWM frequency so as to set a dither frequency by even frequency division of the PWM frequency, and thereby prevent undulation due to dithering.

Solenoid current control section 38 includes an FF compensation part 38a, a dither command part 38b, a first adder 38c, a phase synchronization part 38d, a subtractor 38e, a PD compensation part 38f, a second adder 38g, a voltage change compensation part 38h, and a third adder 38i.

FF compensation part 38a ensures electric current responsiveness. Dither command part 38b outputs a dither command to first adder 38c, while a dither operation request is inputted from dither control section 58. The dither command has an amplitude such as to reduce a mechanical hysteresis of hydraulic pressure control valve 5, 6, 7, wherein the amplitude is determined based on parameters (base current command value, power supply voltage, engine speed, PL pressure command value, oil temperature), and is stored in a schedule form. First adder 38c is of a dither separation type that adjusts the amplitude of the dither only by an amplitude command value.

Phase synchronization part 38d performs phase synchronization among plant dynamics, an IC-to-microcomputer communication delay, and a current averaging component. Phase synchronization part 38d has a gain schedule (FF, phase synchronization, PD compensation). PD compensation part 38f performs PD compensation for a current deviation from subtractor 38e, and thereby improves characteristics of attenuation. Voltage change compensation part 38h corrects the command current to ensure disturbance suppression, when the power supply voltage changes.

SOL drive IC 51, 61, 71 transmits a command value of PWM control to a solenoid body. SOL drive IC 51, 61, 71 includes a current sensing circuit 51a, 61a, 71a for sensing an actual current, and an FB controller 51b, 61b, 71b based on an integral component (I).

Dither control section 58 acquires belt-slip-determining information (hydraulic pressure deviation, safety factor, oil quantity balance lower limit pressure) for determining the possibility of slip of belt 3 during pulley hydraulic pressure control. When determining based on the belt-slip-determining information that there is a high possibility that belt slipping will occur, dither control section 58 outputs a dither operation request for executing a dither operation that superimposes a dither current on the base current command value outputted to solenoid 5a, 6a, 7a ("dither-on operation"). Namely, when determining that there is no possibility of belt slipping or it is in a situation where belt slipping is unlikely to occur, dither control section 58 does not output a dither operation request, but outputs the base current command value, on which no dither current is superimposed, to solenoids 5a, 6a, and 7a ("dither-off operation").

During the dither-on operation, the current waveform applied to solenoid 5a, 6a, 7a of hydraulic pressure control valve 5, 6, 7 is switched to a dither-operated waveform that is formed by superimposing a dither current waveform on a ripple current waveform based on the base current command value as shown in FIG. 3. The dither current waveform is a rectangular current waveform having a lower frequency (for example, about several tens of Hz) than the ripple current waveform (for example, about several hundreds of Hz).

Figure 4:
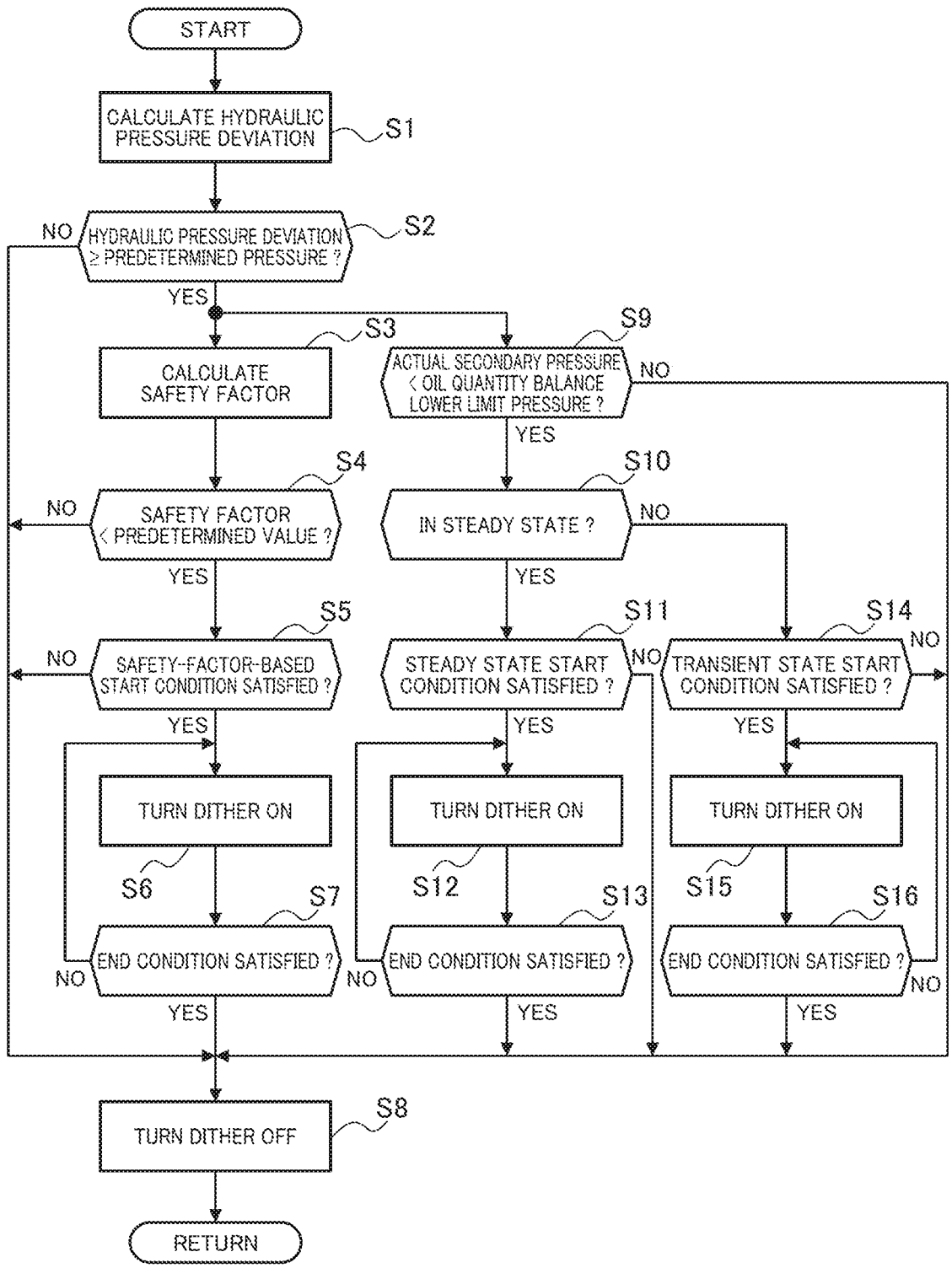
FIG. 4 is a flowchart showing a flow of a dither operation determination control process against belt slipping, which is to be performed by the dither control section of the CVT controller according to the embodiment.

[Configuration of Dither Operation Determination Control Process Against Belt Slipping] FIG. 4 is a flowchart showing a flow of a dither operation determination control process against belt slipping, which is to be performed by dither control section 58 of CVT controller 8 according to the embodiment. The following describes steps in FIG. 4, which constitute the dither operation determination control process against belt slipping. This dither operation determination control process is allowed, while a determination permission condition (brake SW=0; secondary pressure within a region of F/B; not in N range; not during spin determination; inhibitor SW not abnormal; in a normal hydraulic pressure control mode; engine speed within an allowable region; etc.) is satisfied. Even if the determination permission condition is satisfied, the dither operation determination control process is ended when an abnormal failure condition (secondary pressure sensor abnormal; ETC failed; accelerator opening abnormal; CAN abnormal; secondary rotation sensor abnormal; etc.) is satisfied.

At Step S1, dither control section 58 calculates a hydraulic pressure deviation (=(command pressure)−(sensor pressure)) of secondary pressure Psec, and then proceeds to Step S2.

In this example, the command pressure is a secondary pressure command value (=target secondary pressure), wherein during the transmission ratio control, a target primary rotation speed Npri* determined from the operating point (VSP, APO) is converted into a hydraulic pressure command value (primary pressure command value, secondary pressure command value). The sensor pressure is a secondary pressure sensor value (≈ actual pressure) that is a hydraulic pressure value of secondary pulley 2 sensed by secondary pressure sensor 86.

At Step S2, following the calculation of the hydraulic pressure deviation at Step S1, dither control section 58 determines whether or not the hydraulic pressure deviation is greater than or equal to a predetermined pressure value. In case of YES [(hydraulic pressure deviation)≥(predetermined pressure value)], the process proceeds to Step S3 and Step S9. In case of NO [(hydraulic pressure deviation)<(predetermined pressure value)], the process proceeds to Step S8.

The predetermined pressure value is set to a deviation width (for example, about 0.25 Mpa) with which it can be detected that a deviation has occurred between the command pressure and sensor pressure of secondary pressure Psec. The deviation width is a width with which it can be determined that the actual pressure deviates from the command pressure, even when taking account of variation in the value sensed by secondary pressure sensor 86.

At Step S3, following the determination of [(hydraulic pressure deviation)≥(predetermined pressure value)] at Step S2, dither control section 58 calculates a safety factor, and then proceeds to Step S4.

Figure 5:
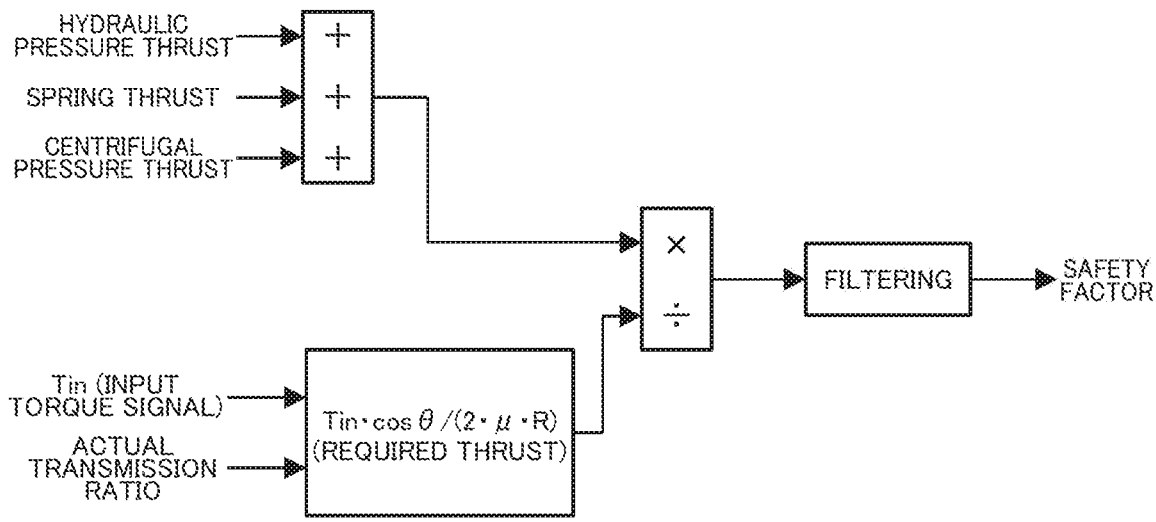
FIG. 5 is a calculation block diagram showing a calculation process for a safety factor used in the dither operation determination control process.

The safety factor is calculated as a ratio of an actual belt thrust to a required belt thrust by a mathematical expression of [(actual belt thrust)/(required belt thrust)]. As shown in FIG. 5, the actual belt thrust is calculated as a sum of a hydraulic thrust caused by the pulley pressure, a spring thrust caused by a return spring, and a centrifugal thrust caused by rotation of the pulley. As shown in FIG. 5, the required belt thrust is calculated by a mathematical expression of [(required belt thrust)=Tin·cos θ/(2·μ·R)], where Tin represents a turbine shaft input torque, θ represents a sheave angle, μ represents a friction coefficient, and R represents a winding radius. For example, the safety factor is corrected by filtering the calculated safety factor in order to prevent frequent detection of a decrease in the safety factor due to one oil shake.

At Step S4, following the calculation of the safety factor at Step S3, dither control section 58 determines whether or not the safety factor is less than a predetermined value. In case of YES [(safety factor)<(predetermined value)], the process proceeds to Step S5. In case of NO [(safety factor) ≥(predetermined value)], the process proceeds to Step S8.

The predetermined value is set to a threshold value (for example, about 1) for determining whether or not there is a high possibility of slip of belt 3. Namely, by setting the predetermined value to 1, it is possible to determine whether or not the actual belt thrust satisfies the required belt thrust.

At Step S5, following the determination at Step S4 that the safety factor is less than the predetermined value, dither control section 58 determines whether or not a safety-factor-based start condition is satisfied. In case of YES (the safety-factor-based start condition is satisfied), the process proceeds to Step S6. In case of NO (the safety-factor-based start condition is not satisfied), the process proceeds to Step S8.

The safety-factor-based start condition is a condition that a state where the safety factor is less than the predetermined value has continued for a set time period (for example, about 50 msec) or more that is set by on-timer count. Namely, even if the safety factor becomes less than the predetermined value, an on-timer count is reset in response to a condition of [(safety factor)≥(predetermined value)] or a condition of [(hydraulic pressure deviation)<(predetermined pressure value)] within the set time period.

At Step S6, following the determination at Step S5 that the safety-factor-based start condition is satisfied or a determination at Step S7 that an end condition is not satisfied, dither control section 58 performs dither-on operation, and then proceeds to Step S7. The dither-on operation is to superimpose the dither current waveform on the ripple current waveform applied to the solenoid 5a, 6a, 7a of hydraulic pressure control valve 5, 6, 7, wherein the ripple current waveform is based on the base current command value (see FIG. 3). During the dither-on operation, it is preferable to execute an engine torque restriction control depending on the actual secondary hydraulic pressure simultaneously with the dither operation control. This serves to quickly suppress the occurrence of belt slipping.

At Step S7, following the dither-on operation at Step S6, dither control section 58 determines whether or not the end condition is satisfied. In case of YES (the end condition is satisfied), the process proceeds to Step S8. In case of NO (the end condition is not satisfied), the process returns to Step S6.

The end condition is a condition that an operation timer count after the dither-on operation reaches a predetermined time period (for example, about 1 sec). The end condition may be a condition indicating that the possibility of slip of belt 3 is eliminated, such as a condition that a predetermined time period has elapsed after satisfaction of the condition of [(safety factor)<(predetermined value)], or a condition that a predetermined time period has elapsed after satisfaction of the condition of [(hydraulic pressure deviation)<(predetermined pressure value)].

At Step S8, following the determination at Step S7, S13 or S16 that the end condition is satisfied, or following the determination at Step S2, S4, S5, S9, S11 or S14 that the answer is NO, dither control section 58 performs dither-off operation, and then proceeds to a return step.

The dither-off operation is to apply the ripple current waveform, which is based on the base current command value, to solenoid 5a, 6a, 7a of hydraulic pressure control valve 5, 6, 7, without superimposing the dither current waveform.

At Step S9, following the determination at Step S2 that the hydraulic pressure deviation is greater than or equal to the predetermined pressure value, dither control section 58 determines whether or not the actual secondary pressure is less than an oil quantity balance lower limit pressure. In case of YES [(actual secondary pressure)<(oil quantity balance lower limit pressure)], the process proceeds to Step S10. In case of NO [(actual secondary pressure)≥(oil quantity balance lower limit pressure)], the process proceeds to Step S8.

In this example, the actual secondary pressure is a secondary pressure sensor value (≈ actual pressure) sensed by secondary pressure sensor 86. The oil quantity balance lower limit pressure is a lower limit of secondary pressure Psec that is determined by oil quantity balance based on the quantity of oil discharged from oil pump 4. In other words, when oil pump 4 is driven by the engine, the oil quantity balance lower limit pressure of the secondary pressure is determined in advance by a mathematical expression or map based on experiments or the like, depending on the engine speed, the transmission ratio, etc.

At Step S10, following the determination at Step S9 that the actual secondary pressure is lower than the oil quantity balance lower limit pressure, dither control section 58 determines whether or not a transmission shifting hydraulic pressure control is in a steady state. In case of YES (in a steady state), the process proceeds to Step S11. In case of NO (in a transient state), the process proceeds to Step S14.

The steady state is a stable state that there is little or no change in the operating point (VSP, APO), and there is little or no change in the transmission ratio and transmission shifting hydraulic pressures (primary pressure, secondary pressure). Accordingly, the steady state is identified, for example, when change of the vehicle speed is less than or equal to a predetermined vehicle speed value (for example, 15 km/h), and change of the accelerator opening is less than or equal to a predetermined opening value (for example, 5 deg). On the other hand, the transient state is an unstable state that the change of the operating point (VSP, APO) is large and the change of the transmission ratio and transmission hydraulic pressures (primary pressure, secondary pressure) is large. In the embodiment, it is determined as being in a transient state, when it is not in a steady state.

At Step S11, following the determination at Step S10 that it is in a steady state, dither control section 58 determines whether or not a steady state start condition is satisfied. In case of YES (the steady state start condition is satisfied), the process proceeds to Step S12. In case of NO (the steady state start condition is not satisfied), the process proceeds to Step S8.

The steady state start condition is satisfied, when it experiences a condition that a state that the hydraulic pressure deviation greater than or equal to the predetermined pressure value and the actual secondary pressure is less than the oil quantity balance lower limit pressure has continued for a set time (for example, about 1.5 sec) for the first time, and after an interval of a predetermined time period (for example, about 30 sec), experiences the condition for the second time. Namely, the steady state start condition is satisfied, when it is determined before and after the interval whether or not the secondary pressure decrease condition is satisfied, and it is determined before and after the interval that the secondary pressure decrease condition is satisfied.

At Step S12, following the determination at Step S11 that the steady state start condition is satisfied, dither control section 58 performs the dither-on operation, and then proceeds to Step S13, similarly as at Step S6.

At Step S13, following the dither-on operation at Step S12, dither control section 58 determines whether or not an end condition is satisfied. In case of YES (the end condition is satisfied), the process proceeds to Step S8. In case of NO (the end condition is not satisfied), the process returns to Step S12.

The end condition is a condition that the operation timer count after the dither-on operation reaches a predetermined time period (for example, about 1 sec). The end condition may be a condition indicating that the possibility of slip of belt 3 is eliminated, such as a condition that a predetermined time period has elapsed after satisfaction of the condition that the hydraulic pressure deviation is less than the predetermined pressure value, or a condition that a predetermined time period has elapsed after satisfaction of the condition that the actual secondary pressure is greater than or equal to the oil quantity balance lower limit pressure.

At Step S14, following the determination at Step S10 that it is in a transient state, dither control section 58 determines whether or not a transient state start condition is satisfied. In case of YES (the transient state start condition is satisfied), the process proceeds to Step S15. In case of NO (the transient state start condition is not satisfied), the process proceeds to Step S8.

Figure 6:
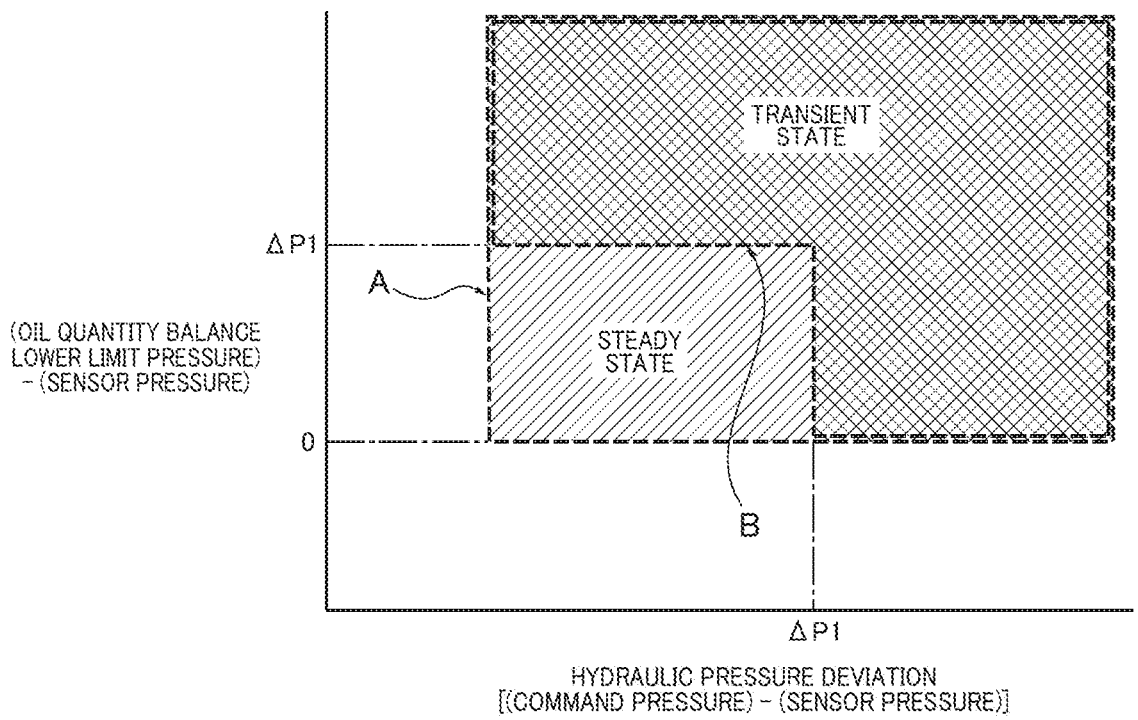
FIG. 6 is an illustrative diagram showing a region for dither operation based on secondary pressure fall determination (for steady states) and a region for dither operation based on secondary pressure fall determination (for transient states) for the dither operation determination control process.

The transient state start condition is a condition that it has experienced a transient state for a predetermined time period (for example, about 1.0 sec), and has experienced a state of [(hydraulic pressure deviation)≥ΔP1 (for example, about 2 Mpa)] or a state of [(oil quantity balance lower limit pressure)−(actual secondary pressure)≥ΔP1 (for example, about 2 Mpa)]. In this way, the transient state start condition is set different from the steady state start condition. The steady state start condition is a condition for delaying the start of the dither operation from the event that the secondary pressure fall determination is made. As schematically illustrated in FIG. 6, the secondary pressure fall determination for the steady state start condition is set to a region indicated by an arrow A and hatched by lines rising to the right. On the other hand, the transient state start condition is a condition for shortening a delay of start of the dither operation from the event that the secondary pressure fall determination is made, as compared to the steady state start condition. As schematically illustrated in FIG. 6, the secondary pressure fall determination for the transient state start condition is set to a cross-hatched region indicated by an arrow B.

At Step S15, following the determination at Step S14 that the transient state start condition is satisfied, dither control section 58 performs the dither-on operation, and then proceeds to Step S16, similarly as at Steps S6 and S12.

At Step S16, following the dither-on operation at Step S15, dither control section 58 determines whether or not an end condition is satisfied. In case of YES (the end condition is satisfied), the process proceeds to Step S8. In case of NO (the end condition is not satisfied), the process returns to Step S15.

The end condition is a condition that the operation timer count after the dither-on operation reaches a predetermined time period (for example, about 1 sec). The end condition may be a condition indicating that the possibility of slip of belt 3 is eliminated, such as a condition that a predetermined time period has elapsed after satisfaction of the condition that the hydraulic pressure deviation is less than the predetermined pressure value, or a condition that a predetermined time period has elapsed after satisfaction of the condition that the actual secondary pressure is greater than or equal to the oil quantity balance lower limit pressure.

The following describes behavior of the embodiment, separately in sections "Dither Control Against Belt Slipping", "Behavior of Dither Operation Determination Control Process Against Belt Slipping", "Behavior of Dither Operation Control Based on Safety Factor Determination", "Behavior of Dither Operation Control Based on Secondary Pressure Fall Determination (for Steady State)", and "Behavior of Dither Operation Control Based on Secondary Pressure Fall Determination (for Transient State)".

[Dither Control Against Belt Slipping] First, it is known that when foreign matter enters a hydraulic pressure control valve, it is effective to supply a dither current to a solenoid, and thereby cause piston movement of a valve spool, and thereby remove the foreign matter (contamination) (see JP H11-082724, etc.). On the other hand, the present inventor has found that if the dither current is supplied to the solenoid of the hydraulic pressure control valve at a high frequency, a load is unnecessarily applied to the hydraulic pressure control valve, thereby adversely affecting the durability and reliability of the hydraulic pressure control valve. Furthermore, the present inventor has found a problem caused by contamination sticking in the hydraulic pressure control valve that in addition to the occurrence of oil vibrations due to fluctuations in output hydraulic pressure from the hydraulic pressure control valve, belt slipping occurs due to a fall in the output hydraulic pressure from the hydraulic pressure control valve.

Paying attention to the problem of occurrence of belt slipping among the problems caused by contamination stick, the dither control against belt slipping according to the present invention is configured to: acquire belt-slip-determining information for determining the possibility of belt slipping during pulley hydraulic pressure control; and supply a dither current to the solenoid only when determining based on the belt-slip-determining information that there is a high possibility that belt slipping will occur.

As shown in FIG. 4, in the dither control against belt slipping during the pulley hydraulic pressure control according to the embodiment, the hydraulic pressure deviation, which is the difference between the command secondary pressure and the actual secondary pressure, is calculated (S1 in FIG. 4). When the hydraulic pressure deviation is greater than or equal to the predetermined pressure value (YES at S2 in FIG. 4), both of the dither control based on safety factor determination (S3 to S7 in FIG. 4) and the dither control based on secondary pressure fall determination (S9 to S16 in FIG. 4) are executed in parallel.

The dither control based on the safety factor determination employs as the belt-slip-determining information the safety factor that is the ratio of the actual belt thrust to the required belt thrust. On the other hand, the dither control based on the secondary pressure fall determination employs, as the belt-slip-determining information, the command secondary pressure, the actual secondary pressure, and the oil quantity balance lower limit of the actual secondary pressure that is determined by the oil quantity balance based on the quantity of oil discharged from oil pump 4.

Furthermore, the start condition for executing the dither control based on the secondary pressure fall determination is set different depending on whether the pulley hydraulic pressure control is in a steady state (YES at S10 in FIG. 4) or in a transient state (NO at S10 in FIG. 4).

The following describes behavior of the dither operation determination control process against belt slipping according to the embodiment, and describes behavior of the dither operation control separately, namely, behavior of the dither operation control based on the safety factor determination, behavior of the dither operation control based on the secondary pressure fall determination (for steady state), and behavior of the dither operation control based on the secondary pressure fall determination (for transient state).

[Behavior of Dither Operation Determination Control Process Against Belt Slipping] The following describes behavior of the dither operation control process against belt slipping with reference to the flowchart of FIG. 4.

As the process is started in response to satisfaction of the determination permission condition, while the hydraulic pressure deviation is less than the predetermined pressure value, the flow of Step S1->Step S2->Step S8->the return step is repeated in the flowchart of FIG. 4. At Step S8, the dither-off operation is performed to apply the ripple current waveform based on the base current command value to solenoid 5a, 6a, 7a of hydraulic pressure control valve 5, 6, 7, without superimposing the dither current waveform. When the hydraulic pressure deviation becomes greater than or equal to the predetermined pressure value, the process is divided at Step S2 into the dither operation determination control process based on the safety factor determination at and after Step S3 and the dither operation determination control process based on the secondary pressure fall determination at and after Step S9, and the two divided processes are executed in parallel with each other.

In the dither operation determination control process based on the safety factor determination, when the hydraulic pressure deviation is greater than or equal to the predetermined pressure value and the safety factor is less than the predetermined value, the process proceeds as Step S1->Step S2->Step S3->Step S4->Step S5. At Step S5, it is determined whether or not the safety-factor-based start condition is satisfied. When the state that the safety factor is less than the predetermined value has continued for the predetermined time period set by on-timer counting, the safety-factor-based start condition is determined as being satisfied at Step S5, and the process proceeds as Step S6->Step S7. While it is determined at Step S7 that the end condition is not satisfied, the flow from Step S6 to Step S7 is repeated. At Step S6, the dither is turned on and a dither control activation request flag is outputted based on the dither-on operation, the dither current waveform is superimposed on the ripple current waveform, which is based on the base current command value, and applied to solenoid 5a, 6a, 7a of hydraulic pressure control valve 5, 6, 7. When the operation timer count after the dither-on operation reaches the predetermined time period and it is determined at Step S7 that the end condition is satisfied, the process proceeds from Step S7 to Step S8 and the return step, and the dither-on state is switched to the dither-off state.

In the dither operation determination control process based on the secondary pressure fall determination, when the hydraulic pressure deviation is greater than or equal to the predetermined pressure value, and the actual secondary pressure is less than the oil quantity balance lower limit pressure, the process proceeds as Step S1->Step S2->Step S9->Step S10. At Step S10, it is determined whether or not the transmission hydraulic pressure control is in a steady state. When it is determined that the transmission hydraulic pressure control is in a steady state, the process proceeds to the dither operation determination control process based on the secondary pressure fall determination (for steady state) at and after Step S11. When it is determined that the transmission hydraulic pressure control is in a transient state, the process proceeds to the dither operation determination control process based on the secondary pressure fall determination (for transient state) at and after Step S14.

In the dither operation determination control process based on the secondary pressure fall determination (for steady state), the process proceeds from Step S10 to Step S11. At Step S11, it is determined whether or not the steady state start condition is satisfied. Then, when the condition that the state that the hydraulic pressure deviation is greater than or equal to the predetermined pressure value and the actual secondary pressure is less than the oil quantity balance lower limit pressure has continued for the set time is experienced twice, i.e., before and after the predetermined time period interval, the steady state start condition is determined as being satisfied at Step S11. When the steady state start condition is determined as being satisfied, the process proceeds from Step S11 to Step S12 and Step S13. While it is determined at Step S13 that the end condition is not satisfied, the flow from Step S12 to Step S13 is repeated. At Step S12, the dither is turned on and the dither control activation request flag is outputted based on the dither-on operation, and the dither current waveform is superimposed on the ripple current waveform, which is based on the base current command value, is applied to solenoid 5a, 6a, 7a of hydraulic pressure control valve 5, 6, 7. When the operation timer count after the dither-on operation reaches the predetermined time period and it is determined at Step S13 that the end condition is satisfied, the process proceeds from Step S13 to Step S8 and the return step, and the dither-on state is switched to the dither-off state.

In the dither operation determination control process based on the secondary pressure fall determination (for transient state), the process proceeds from Step S10 to Step S14. At Step S14, it is determined whether or not the transient state start condition is satisfied. Then, when the transient state is experienced for the predetermined time period, and the state of [(hydraulic pressure deviation)≥ΔP1] or the state of [(oil quantity balance lower limit pressure)−(actual secondary pressure)≥ΔP1] is experienced, it is determined at Step S14 that the transient state start condition is satisfied. When it is determined that the transient state start condition is satisfied, the process proceeds from Step S14 to Step S15 and Step S16. While it is determined at Step S16 that the end condition is not satisfied, the flow from Step S15 to Step S16 is repeated. At Step S15, the dither is turned on and the dither control activation request flag is outputted based on the dither-on operation, and the dither current waveform is superimposed on the ripple current waveform, which is based on the base current command value, and applied to solenoid 5a, 6a, 7a of hydraulic pressure control valve 5, 6, 7. When the operation timer count after the dither-on operation reaches the predetermined time period and it is determined at Step S16 that the end condition is satisfied, the process proceeds from Step S16 to Step S8 and the return step, and the dither-on state is switched to the dither-off state.

Figure 7:
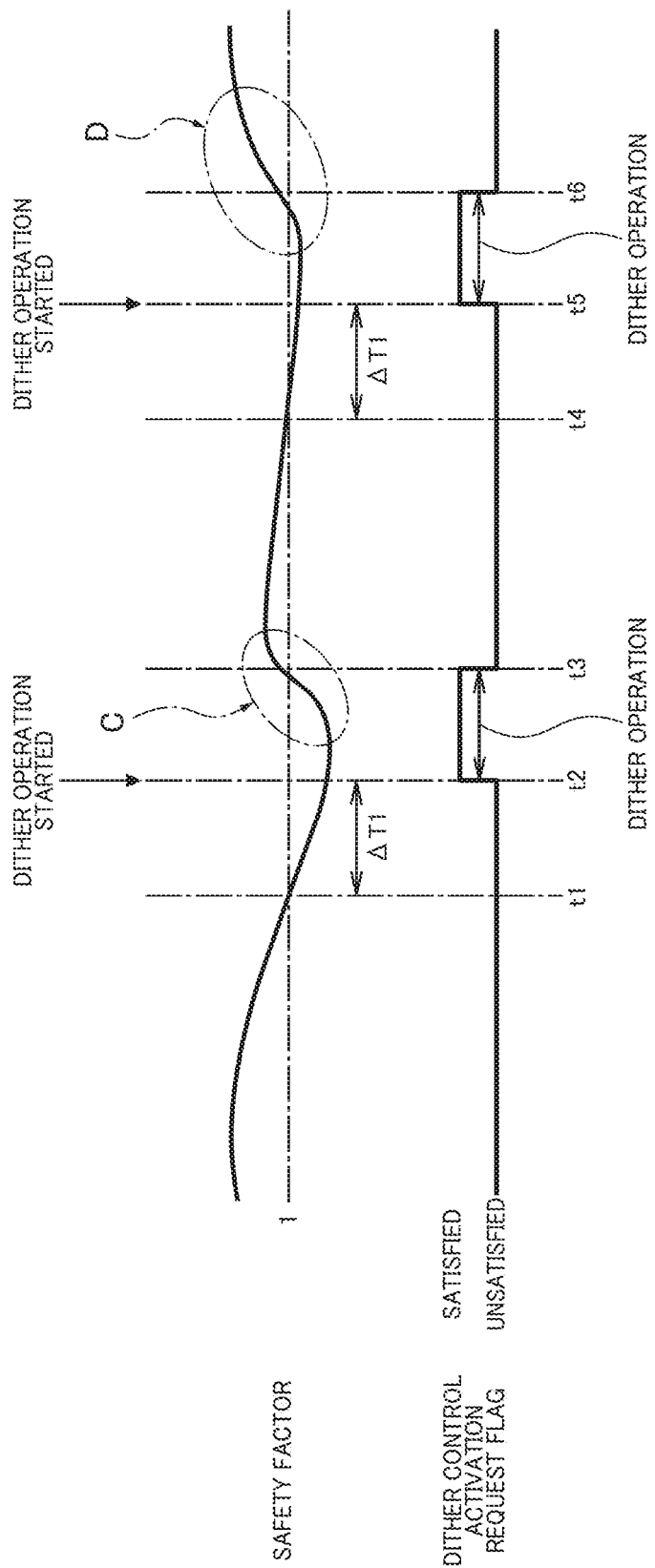
FIG. 7 is a time chart showing the safety factor and a dither control activation request flag in a situation of dither operation based on safety factor determination.

[Behavior of Dither Operation Control Based on Safety Factor Determination] FIG. 7 is a time chart showing the safety factor and the dither control activation request flag in a situation of dither operation based on safety factor determination. The following describes behavior of the dither operation control based on the safety factor determination with reference to FIG. 7.

Until a time instant t1, the safety factor gradually decreases from above 1 toward 1. At time instant t1, the safety factor becomes less than 1 and enters the state of [(safety factor)<(predetermined value)], so that the timer counting is started. Then, at a time instant t2 when the set time period ΔT1 (about 50 msec) has elapsed from the start of the timer counting, the dither is turned on to start the dither operation, and continue the dither operation during the dither operation time period (about 1 sec) until a time instant t3. This first-time dither operation serves to remove foreign matter that has entered the hydraulic pressure control valve 5, 6, 7, so that the safety factor recovers from below 1 to above 1 with characteristics as indicated by an arrow C in FIG. 7.

The safety factor has recovered to above 1 at time instant t3. However, for example, when the foreign matter that has entered the hydraulic pressure control valve 5, 6, 7 has not been completely removed, the safety factor gradually falls during the dither-off operation after time instant t3. At a time instant t4 when the safety factor becomes less than 1 and enters the state of [(safety factor)<(predetermined value)], the timer counting is started. Then, at a time instant t5 when the set time period ΔT1 (about 50 msec) has elapsed from the start of the timer counting, the dither is turned on to start the dither operation, and continue the dither operation during the dither operation time period (about 1 sec) until a time instant t6. The foreign matter that has entered the hydraulic pressure control valve 5, 6, 7 is completely removed by this second-time dither operation, so that the safety factor recovers from below 1 to above 1 with characteristics indicated by an arrow D in FIG. 7.

In this way, the safety factor that is information for determining whether the belt clamping force is sufficient or insufficient is used as the belt-slip-determining information, and for the dither operation is performed based on the safety factor determination, the safety-factor-based start condition is set to shorten the time period from the determination of fall of the safety factor to the start of the dither operation. Specifically, the safety-factor-based start condition is set to a condition that the state where the safety factor is less than the predetermined value has continued for the set time period set by the on-timer counting (S5 in FIG. 4). This serves to start the dither operation responsively in response to a determination of a decrease in the safety factor, and thereby remove quickly foreign matter that has entered the hydraulic pressure control valve 5, 6, 7, and thereby prevent the occurrence of belt slipping.

Figure 8:
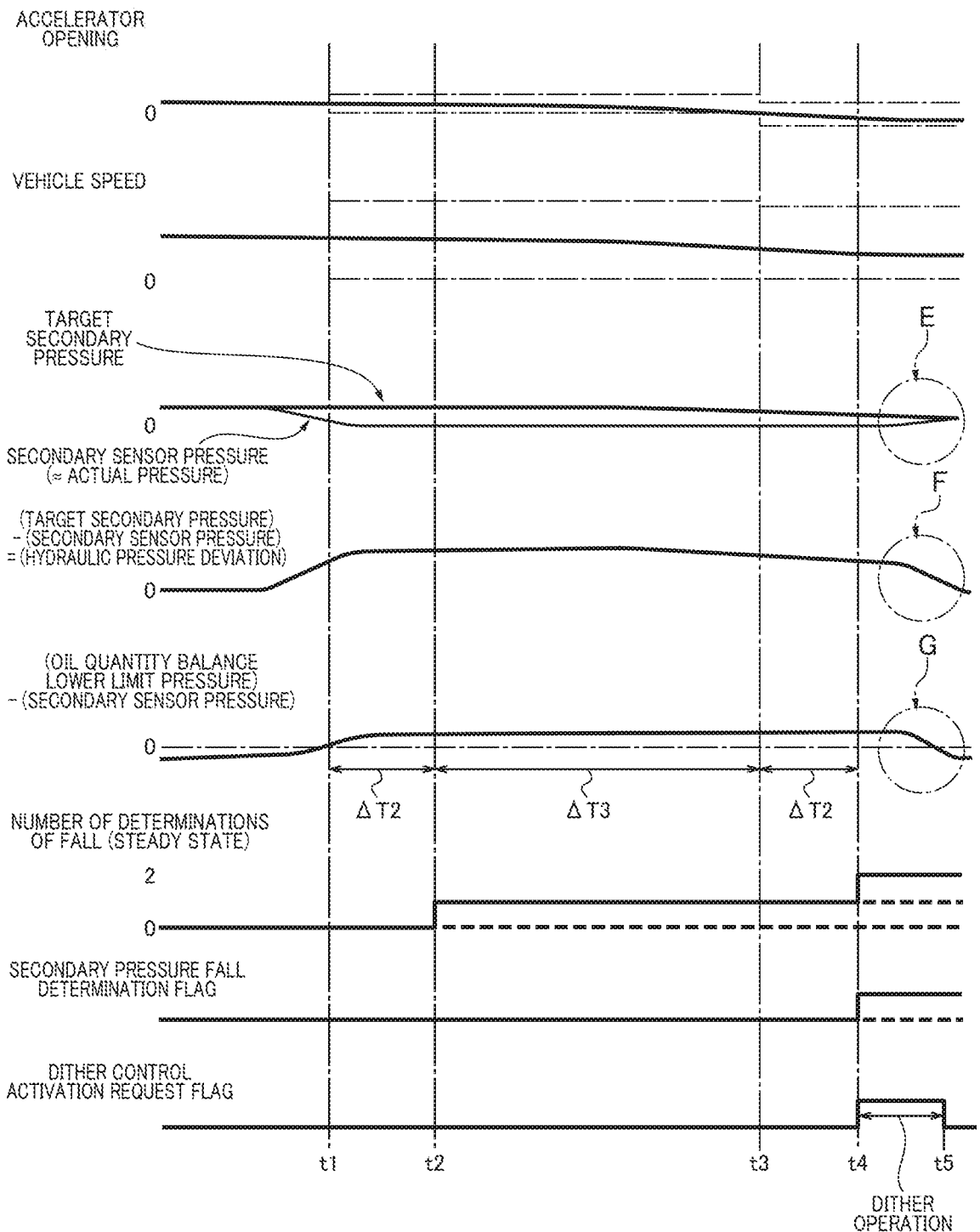
FIG. 8 is a time chart showing characteristics of parameters in a situation of dither operation based on secondary pressure fall determination (for steady states), wherein the parameters include an accelerator opening, a vehicle speed, a target secondary pressure, a secondary pressure sensor value, a hydraulic pressure deviation, a quantity of [(oil quantity balance lower limit pressure)−(secondary pressure sensor value)], a number of fall determinations, a secondary pressure fall determination flag, and the dither control activation request flag.

[Behavior of Dither Operation Control Based on Secondary Pressure Fall Determination (for Steady State)] FIG. 8 is a time chart showing characteristics of parameters in a situation of dither operation based on secondary pressure fall determination (for steady state). The following describes behavior of the dither operation control based on the secondary pressure fall determination (for steady state) with reference to FIG. 8.

Until a time instant t1, the hydraulic pressure deviation is less than the predetermined pressure value, and the quantity of [(oil quantity balance lower limit pressure)−(secondary pressure sensor value)] is less than or equal to 0. At time instant t1 when the hydraulic pressure deviation becomes greater than or equal to the predetermined pressure value and the quantity of [(oil quantity balance lower limit pressure)−(secondary pressure sensor value)] becomes greater than 0, and the secondary pressure fall determination condition is satisfied, the fall determination (for steady state) is started for the first time. Thereafter, at a time instant t2 when the set time period ΔT2 (about 1.5 seconds) has elapsed with the secondary pressure fall determination condition maintained satisfied, the number of times of the fall determination (for steady state) is set to 1.

At a time instant t3 when the interval time period (about 30 seconds) has elapsed after time instant t2, the hydraulic pressure deviation is greater than or equal to the predetermined pressure value, and the quantity of [(oil quantity balance lower limit pressure)−(secondary pressure sensor value)] is still greater than 0, and the secondary pressure fall determination condition is satisfied, so that the fall determination (for steady state) is started for the second time. Thereafter, at a time instant t4 when the set time period ΔT2 (about 1.5 sec) has elapsed with the secondary pressure fall determination condition maintained satisfied, the number of times of the fall determination (for steady state) is set to 2.

At time instant t4 when the number of times of the fall determination (for steady state) is equal to 2, the secondary pressure fall flag is rewritten from 0 to 1, and the dither operation is started, and is continued for the operating time period (about 1 sec) until a time instant t5.

When the foreign matter that has entered the hydraulic pressure control valve 5, 6, 7 is removed by the dither operation, the secondary pressure sensor value converges toward the target secondary pressure with characteristics indicated by an arrow E in FIG. 8. Furthermore, the hydraulic pressure deviation converges toward zero with characteristics indicated by an arrow F in FIG. 8. Moreover, the quantity of [(oil quantity balance lower limit pressure)−(secondary pressure sensor value)] converges to 0 or less, and the relationship that the secondary pressure sensor value is greater than the oil quantity balance lower limit pressure is restored with characteristics indicated by an arrow G in FIG. 8.

In this way, for the dither operation based on the secondary pressure fall determination (for steady state), the steady state start condition is set to delay the timing of the start of the dither operation from the determination of the secondary pressure fall. Specifically, the steady state start condition is a condition that the state where the hydraulic pressure deviation is greater than or equal to the predetermined pressure value and the actual secondary pressure is less than the oil quantity balance lower limit pressure has continued for the set time period is experienced twice, i.e. before and after the predetermined time period interval (S11 in FIG. 4). Therefore, the dither operation is started after the sufficient confirmation of fall of the secondary pressure in the steady state, so that the frequency of the dither operation for each hydraulic pressure control valve 5, 6, 7 is reduced. This serves to improve the durability and reliability of hydraulic pressure control valve 5, 6, 7. In a steady state, even if belt slipping occurs before the dither operation is started, the speed of progress of belt slipping is slow, so that the belt slipping causes no problem.

Figure 9:
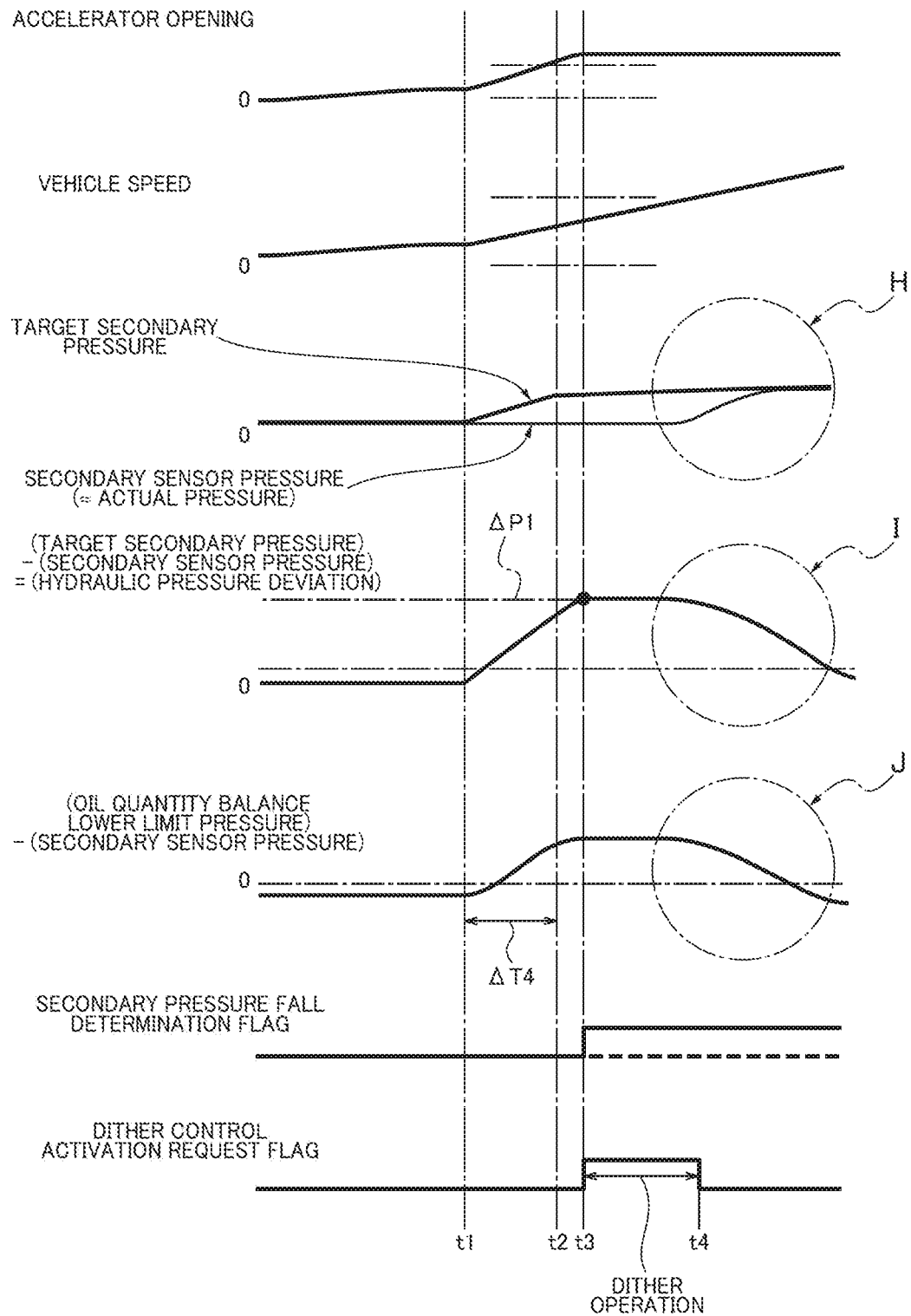
FIG. 9 is a time chart showing characteristics of parameters in a situation of dither operation based on secondary pressure fall determination (for transient states), wherein the parameters include the accelerator opening, vehicle speed, target secondary pressure, secondary pressure sensor value, hydraulic pressure deviation, quantity of [(oil quantity balance lower limit pressure)−(secondary pressure sensor value)], number of fall determinations, secondary pressure fall determination flag, and dither control activation request flag.

[Behavior of Dither Operation Control Based on Secondary Pressure Fall Determination (for Transient State)] FIG. 9 is a time chart showing characteristics of parameters in a situation of dither operation based on secondary pressure fall determination (for transient state). The following describes behavior of the dither operation control based on the secondary pressure fall determination (for transient state) with reference to FIG. 9.

At a time instant t1, a transient state begins which contains changes in the accelerator opening and vehicle speed. The transient state is experienced for the predetermined time period ΔT4 (about 1 second) from time instant t1 to a time instant t2. Immediately after time instant t2, at a time instant t3 when the state that the hydraulic pressure deviation is greater than or equal to ΔP1 is experienced, the dither is turned on to start the dither operation, and the dither operation is continued during the dither operation time period (about 1 sec) until a time instant t4.

When the foreign matter that has entered the hydraulic pressure control valve 5, 6, 7 is removed by the dither operation, the secondary pressure sensor value converges toward the target secondary pressure with characteristics indicated by an arrow H in FIG. 9. Furthermore, the hydraulic pressure deviation converges toward zero with characteristics indicated by an arrow I in FIG. 9. Moreover, the quantity of [(oil quantity balance lower limit pressure)−(secondary pressure sensor value)] converges to 0 or less, and the relationship that the secondary pressure sensor value is greater than the oil quantity balance lower limit pressure is restored with characteristics indicated by an arrow J in FIG. 9.

In this way, for the dither operation based on the secondary pressure fall determination (for transient state), the transient state start condition is set to a condition that the time period from the determination of the secondary pressure fall to the start of the dither operation is shorter than that of the steady state start condition. Specifically, the transient state start condition is a condition that the transient state is experienced for the predetermined time period, and the state that the hydraulic pressure deviation is greater than or equal to $\Delta P1$ or the state that the quantity of [(oil quantity balance lower limit pressure)−(actual secondary pressure) is greater than or equal to $\Delta P1$ is experienced (S14 in FIG. 4). Therefore, in response to a determination of the secondary pressure fall in a transient state, the dither operation is started responsively. This serves to quickly remove the foreign matter that has entered hydraulic pressure control valve 5, 6, 7, and thereby prevent the occurrence of belt slipping. In a transient state, if belt slipping occurs before the dither operation starts, the belt slipping proceeds rapidly with an increase in the accelerator opening (an increase in input torque). Accordingly, it is required to start the dither operation early.

The following describes effects obtained by the control device for belt-type continuously variable transmission CVT according to the embodiment.

<1> The continuously variable transmission control device includes: a hydraulic pressure control valve (5, 6, 7) structured to control a pulley hydraulic pressure supplied to primary and secondary pulleys (1, 2), wherein a belt (3) is wound around the primary and secondary pulleys (1, 2); and a controller (CVT controller 8) configured to set a command base current outputted to a solenoid (5a, 6a, 7a) of the hydraulic pressure control valve (5, 6, 7), based on a command value of the pulley hydraulic pressure supplied to primary and secondary pulleys (1, 2); wherein the controller (CVT controller 8) includes a dither control section (58) configured to: acquire belt-slip-determining information for determining a possibility of occurrence of slip of the belt (3) during control of the pulley hydraulic pressure; and perform a dither operation in response to a determination based on the belt-slip-determining information that the possibility of occurrence of slip of the belt (3) is high, wherein the dither operation is to superimpose a dither current on the command base current outputted to the solenoid (5a, 6a, and 7a). The dither control section (58) is configured to suspend performing the dither operation, when it is not determined based on the belt-slip-determining information that the possibility of occurrence of slip of the belt (3) is high, wherein the dither operation is to superimpose a dither current on the command base current outputted to the solenoid (5a, 6a, 7a). This serves to prevent the occurrence of belt slipping during the pulley hydraulic pressure control, without adversely affecting the durability and reliability of the hydraulic pressure control valve (5, 6, 7).

<2> The continuously variable transmission control device is configured such that the dither control section (58) is configured to perform the dither operation based on safety factor determination by: acquiring a safety factor as the belt-slip-determining information during control of the pulley hydraulic pressure, wherein the safety factor is a ratio of an actual belt thrust to a required belt thrust; and determining the possibility of occurrence of slip of the belt as being high, in response to a determination that the safety factor is less than a predetermined value. This serves to perform the dither operation in situations where the possibility of belt slipping is high, by using as the belt-slip-determining information the safety factor that is information for determining whether the belt clamping force is sufficient or insufficient, in addition to the effect of<1>.

<3> The continuously variable transmission control device is configured such that the dither control section (58) is configured to perform the dither operation in response to satisfaction of a start condition, wherein the start condition is a condition that the determination that the safety factor is less than the predetermined value has continued for a predetermined time period. This serves to start the dither operation responsively in response to a determination of a decrease in the safety factor, and thereby remove quickly foreign matter that has entered the hydraulic pressure control valve 5, 6, 7, and thereby prevent the occurrence of belt slip, in addition to the effect of<2>.

<4> The continuously variable transmission control device is configured such that the dither control section (58) is configured to perform the dither operation based on secondary pressure fall determination by: acquiring an oil quantity balance lower limit pressure as the belt-slip-determining information during control of the pulley hydraulic pressure, wherein the oil quantity balance lower limit pressure is a lower limit of a secondary pressure that is determined by an oil quantity balance based on a quantity of oil discharged from an oil pump (4); and determining the possibility of occurrence of slip of the belt as being high, in response to a determination that an actual value of the secondary pressure is lower than the oil quantity balance lower limit pressure. This serves to perform the dither operation in situations where the possibility of belt slipping is high, by using as the belt-slip-determining information the oil quantity balance lower limit pressure that is information for determining a decrease in the actual secondary pressure, in addition to the effect of<1>.

<5> The continuously variable transmission control device is configured such that the dither control section (58) is configured to perform the dither operation based on the secondary pressure fall determination by: setting a first start condition for starting the dither operation in a situation that the control of the pulley hydraulic pressure is in a steady state, and a second start condition for starting the dither operation in a situation that the control of the pulley hydraulic pressure is in a transient state, wherein the first start condition is different from the second start condition; setting the first start condition to contain a first delay from the secondary pressure fall determination to start of the dither operation; and setting the second start condition to contain a second delay from the secondary pressure fall determination to start of the dither operation, wherein the second delay is shorter than the first delay. This serves to reduce the frequency of dither operation in the steady state and prevent the occurrence of belt slip by high response in the transient state, in balance, by using different start conditions depending on the speed of progress of belt slipping, in addition to the effect of<4>.

<6> The continuously variable transmission control device is configured such that the dither control section (58) is configured to: determine whether or not a hydraulic pressure deviation is greater than or equal to a predetermined pressure value during control of the pulley hydraulic pressure, wherein the hydraulic pressure deviation is a deviation between a command secondary pressure and an actual secondary pressure; and perform the dither operation based on safety factor determination and based on secondary pressure fall determination simultaneously, in response to a determination that the hydraulic pressure deviation is greater than or equal to the predetermined pressure value, wherein the safety factor determination employs a safety factor that is a ratio of an actual belt thrust to a required belt thrust, and wherein the secondary pressure fall determination employs an oil quantity balance lower limit pressure that is a lower limit of the actual secondary pressure that is determined by an oil quantity balance based on a quantity of oil discharged from an oil pump (4). This serves to appropriately determine the possibility of slip of the belt (3) and prevent the belt slipping, by using both of the dither control based on the safety factor determination and the dither control based on the secondary pressure fall determination, in addition to the effect of<1>. Namely, when the actual secondary pressure is not lower than the oil quantity balance lower limit pressure, the dither operation based on the safety factor determination can be performed, and when the safety factor is greater than or equal to the predetermined value, the dither operation based on the secondary pressure fall determination can be performed. In this way, the determinations about the dither operation are performed in a manner to complement each other.

Although the continuously variable transmission control device according to the present invention is described with reference to the embodiment, specific configuration is not limited to the embodiment, but may be applied with design modification or design addition unless going beyond the subject matter of the present invention defined by the claims.

In the embodiment, the dither control section 58 performs the dither control based on the safety factor determination and the dither control based on the secondary pressure fall determination in parallel when determining that the hydraulic pressure deviation is greater than or equal to the predetermined pressure value. However, the dither control section does not need to use both of the dither control based on the safety factor determination and the dither control based on the secondary pressure fall determination, but may be configured to perform only the dither control based on the safety factor determination, or only the dither control based on the secondary pressure fall determination.

In the embodiment, the continuously variable transmission control device according to the present invention is applied to an engine-equipped vehicle such as an engine vehicle or a hybrid vehicle. However, the continuously variable transmission control device according to the present invention may be applied to an electric vehicle, a fuel cell vehicle, etc., if the vehicle is equipped with a continuously variable transmission based on hydraulic pressure control.

The invention claimed is:

1. A continuously variable transmission control device comprising:
   a hydraulic pressure control valve structured to control a pulley hydraulic pressure supplied to primary and secondary pulleys, wherein a belt is wound around the primary and secondary pulleys; and
   a controller configured to set a command base current outputted to a solenoid of the hydraulic pressure control valve, based on a command value of the pulley hydraulic pressure;
   wherein the controller includes a dither control section configured to:
      acquire belt-slip-determining information for determining a possibility of occurrence of slip of the belt during control of the pulley hydraulic pressure; and
      perform a dither operation in response to a determination based on the belt-slip-determining information that the possibility of occurrence of slip of the belt is high, wherein the dither operation is to superimpose a dither current on the command base current.

2. The continuously variable transmission control device as claimed in claim 1, wherein the dither control section is configured to perform the dither operation based on safety factor determination by:
   acquiring a safety factor as the belt-slip-determining information during control of the pulley hydraulic pressure (Ppri, Psec), wherein the safety factor is a ratio of an actual belt thrust to a required belt thrust; and
   determining the possibility of occurrence of slip of the belt as being high, in response to a determination that the safety factor is less than a predetermined value.

3. The continuously variable transmission control device as claimed in claim 2, wherein the dither control section is configured to perform the dither operation in response to satisfaction of a start condition, wherein the start condition is a condition that the determination that the safety factor is less than the predetermined value has continued for a predetermined time period.

4. The continuously variable transmission control device as claimed in claim 1, wherein the dither control section is configured to perform the dither operation based on secondary pressure fall determination by:
   acquiring an oil quantity balance lower limit pressure as the belt-slip-determining information during control of the pulley hydraulic pressure, wherein the oil quantity balance lower limit pressure is a lower limit of a secondary pressure that is determined by an oil quantity balance based on a quantity of oil discharged from an oil pump; and
   determining the possibility of occurrence of slip of the belt as being high, in response to a determination that an actual value of the secondary pressure is lower than the oil quantity balance lower limit pressure.

5. The continuously variable transmission control device as claimed in claim 4, wherein the dither control section is configured to perform the dither operation based on the secondary pressure fall determination by:
   setting a first start condition for starting the dither operation in a situation that the control of the pulley hydraulic pressure is in a steady state, and a second start condition for starting the dither operation in a situation that the control of the pulley hydraulic pressure is in a transient state, wherein the first start condition is different from the second start condition;
   setting the first start condition to contain a first delay from the secondary pressure fall determination to start of the dither operation; and
   setting the second start condition to contain a second delay from the secondary pressure fall determination to start of the dither operation, wherein the second delay is shorter than the first delay.

6. The continuously variable transmission control device as claimed in claim 1, wherein the dither control section is configured to:
   determine whether or not a hydraulic pressure deviation is greater than or equal to a predetermined pressure value during control of the pulley hydraulic pressure, wherein the hydraulic pressure deviation is a deviation between a command secondary pressure and an actual secondary pressure; and
   perform the dither operation based on safety factor determination and based on secondary pressure fall determination simultaneously, in response to a determination that the hydraulic pressure deviation is greater than or equal to the predetermined pressure value, wherein the safety factor determination employs a safety factor that is a ratio of an actual belt thrust to a required belt thrust, and wherein the secondary pressure fall determination employs an oil quantity balance lower limit pressure that is a lower limit of the actual secondary pressure that is determined by an oil quantity balance based on a quantity of oil discharged from an oil pump.

7. A continuously variable transmission control method for a continuously variable transmission including a hydraulic pressure control valve structured to control a pulley hydraulic pressure supplied to primary and secondary pulleys, wherein a belt is wound around the primary and secondary pulleys, the continuously variable transmission control method comprising:
   setting a command base current outputted to a solenoid of the hydraulic pressure control valve, based on a command value of the pulley hydraulic pressure;
   acquiring belt-slip-determining information for determining a possibility of occurrence of slip of the belt during control of the pulley hydraulic pressure; and
   performing a dither operation in response to a determination based on the belt-slip-determining information that the possibility of occurrence of slip of the belt is high, wherein the dither operation is to superimpose a dither current on the command base current.

8. The continuously variable transmission control method as claimed in claim 7, comprising:
   acquiring a safety factor as the belt-slip-determining information, wherein the safety factor is a ratio of an actual belt thrust to a required belt thrust;
   comparing the safety factor with a predetermined value; and
   determining the possibility of occurrence of slip of the belt as being high, in response to a determination that the safety factor is less than the predetermined value.

9. The continuously variable transmission control method as claimed in claim 7, comprising:
   acquiring an oil quantity balance lower limit pressure as the belt-slip-determining information during control of the pulley hydraulic pressure, wherein the oil quantity balance lower limit pressure is a lower limit of a secondary pressure that is determined by an oil quantity balance based on a quantity of oil discharged from an oil pump;
   comparing an actual value of the secondary pressure with the oil quantity balance lower limit pressure; and
   determining the possibility of occurrence of slip of the belt as being high, in response to a determination that the actual value of the secondary pressure is lower than the oil quantity balance lower limit pressure.

\* \* \* \* \*